(12) United States Patent
Okawa et al.

(10) Patent No.: US 6,642,321 B1
(45) Date of Patent: *Nov. 4, 2003

(54) POLYACETAL RESIN COMPOSITION

(75) Inventors: Hidetoshi Okawa, Fuji (JP); Yoshihisa Tajima, Fuji (JP); Kuniaki Kawaguchi, Fuji (JP)

(73) Assignee: Polyplastics Co., Ltd. (JP)

( * ) Notice: Subject to any disclaimer, the term of this patent is extended or adjusted under 35 U.S.C. 154(b) by 0 days.

This patent is subject to a terminal disclaimer.

(21) Appl. No.: 09/787,955

(22) PCT Filed: Jun. 23, 2000

(86) PCT No.: PCT/JP00/04150

§ 371 (c)(1),
(2), (4) Date: Mar. 23, 2001

(87) PCT Pub. No.: WO00/78866

PCT Pub. Date: Dec. 28, 2000

(30) Foreign Application Priority Data

Jun. 23, 1999 (JP) .............................. 11-177268

(51) Int. Cl.[7] .............................................. C08L 59/00
(52) U.S. Cl. ........................................ 525/398; 525/472
(58) Field of Search ................................. 525/398, 472

(56) References Cited

U.S. PATENT DOCUMENTS

| | | | |
|---|---|---|---|
| 3,275,604 A | * | 9/1966 | Kray |
| 3,980,734 A | * | 9/1976 | Burg |
| 4,181,685 A | | 1/1980 | Kern et al. |
| 5,079,330 A | | 1/1992 | Makabe et al. |
| 5,929,195 A | | 7/1999 | Kawaguchi et al. |
| 6,255,440 B1 | * | 7/2001 | Okawa |

FOREIGN PATENT DOCUMENTS

| | | | |
|---|---|---|---|
| EP | 0 412 783 A2 | 2/1991 | ............ C08G/2/18 |
| JP | 3-170526 | 7/1991 | |
| JP | 4-39319 | 2/1992 | |
| JP | 11-35649 | 2/1999 | |
| WO | 00/05285 | * 2/2000 | |

* cited by examiner

*Primary Examiner*—Patricia A. Short
(74) *Attorney, Agent, or Firm*—Nixon & Vanderhye P.C.

(57) ABSTRACT

To provide a polyacetal resin composition which is highly rigid and has excellent surface hardness, sliding characteristics, etc. That is, a polyacetal resin composition, produced by blending 100 parts by weight of a polyacetal resin (A) with 0.01–100 part(s) by weight of a branched polyacetal copolymer (B) which is obtained by copolymerization of 100 parts by weight of trioxane (a), 0.01–10 part(s) by weight of a monofunctional glycidyl compound (b) and 0–20 part(s) by weight of a cyclic ether compound (c) which is copolymerizable with trioxane.

3 Claims, 1 Drawing Sheet

POLYACETAL RESIN COMPOSITION

BACKGROUND OF THE INVENTION

1. Technical Field to Which the Invention Belongs

The present invention relates to a polyacetal resin composition having high rigidity, and in addition, high surface hardness and excellent sliding property.

2. Prior Art

Polyacetal resins have excellent properties in terms of mechanical property, thermal property, electric property, sliding property, molding property, etc. and have been widely used in electric appliances, automobile parts, precision instrument parts, etc. mostly as constituting materials, mechanical parts, etc. thereof. However, as a result of expansion of the fields to which polyacetal resins are used, there are some cases where further improvements in rigidity, surface hardness and sliding property are demanded. As a means for improving the rigidity to meet such a demand, a method where fibrous fillers are filled in polyacetal resin has been known. In this method, however, problems such as a poor appearance of the molded product and a-lowering of the sliding property are resulted. In case of polyacetal copolymers, it is known that reducing the copolymerizing amount of comonomers brings an improvement in the rigidity, etc. In this method, however, the rigidity is only slightly improved and the sliding property, even though not damaged, is not in the least improved whereas problems such as a lowering of thermal stability of the polymer are resulted, and therefore, the method does not always meet with the demands.

In view of such problems in the prior art, the present inventors thoroughly changed their position and paid attention to modification of the polymer structure of polyacetal copolymers itself and an improvement in rigidity, surface hardness and sliding property by using the resin composition comprising such a modified polymer. Conventionally, although there are some references teaching modification of the polymer structure of polyacetal resins, e.g., JP-A 3-170526, it is not too much say that there has been little disclosure on the improvement in the rigidity and sliding property of a polyacetal resin on the basis of the above conception.

DISCLOSURE OF THE INVENTION

An object of the present invention is to solve the above problems and to offer a copolymerized polyacetal resin composition having high rigidity, high surface hardness, excellent sliding property, etc.

The present inventors have carried out an intensive investigation for achieving the above-mentioned object and have unexpectedly found that it is now possible to increase a rigidity and surface hardness and to improve a sliding property to such an extent that have been unforeseeable by blending the polyacetal copolymers where branched structures are introduced by copolymerization of a polyacetal resin, as the substrate, and a certain type of specific glycidyl ether compound whereupon the present invention has been achieved.

That is, the present invention relates to a polyacetal resin composition, produced by blending 100 parts by weight of a polyacetal resin (A) with 0.01–100 part(s) by weight of a branched polyacetal copolymer (B), which is obtained by copolymerization of 100 parts by weight of trioxane (a), 0.01–10 part(s) by weight of a monofunctional glycidyl compound (b) and 0–20 part(s) by weight of a cyclic ether compound (c) which is copolymerizable with trioxane.

The present invention is a polyacetal resin composition comprising 100 parts by weight of the polyacetal resin (A) and 0.01–100 part(s) by weight of the branched polyacetal copolymer (B).

The monofunctional glycidyl compound (b) is preferably any glycidyl ether compound represented by the following formulas (I), (II), (III) and (IV):

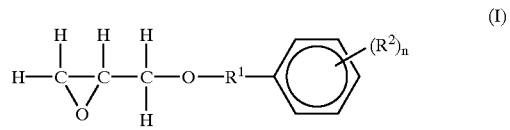

(I)

wherein $R^1$ is a $C_{1-20}$ polyalkylene oxide glycol residue, an alkylene group or a substituted alkylene group; $R^2$ is a substituent for hydrogen in a phenyl group and is a $C_{1-12}$ alkyl group, a substituted alkyl group, an alkoxy group, an aryl group, a substituted aryl group or halogen; n is an integer of 0–5; and, when n is 2 or more, $R^2$ may be the same or different;

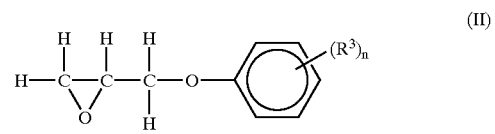

(II)

wherein $R^3$ is a substituent for hydrogen in a phenyl group and is a $C_{1-12}$ alkyl group, a substituted alkyl group, an alkoxy group, an aryl group, a substituted aryl group or halogen; n is an integer of 1–5; and, when n is 2 or more, $R^3$S may be the same or different;

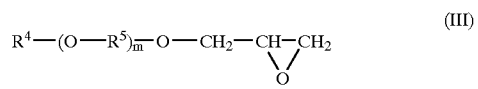

(III)

wherein $R^4$ is an alkyl group having 1–30 carbon(s) or an alkenyl or alkynyl group having 2–20 carbons; $R^5$ is an alkylene group having 1–30 carbons; and m is an integer of 1–20; and

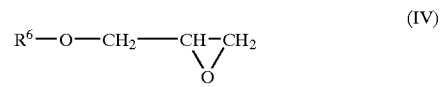

(IV)

wherein $R^6$ is an alkyl group having 1–30 carbon(s).

DETAILED DESCRIPTION OF THE INVENTION

The structure of the polyacetal resin composition of the present invention will be explained in detail.

Firstly, a polyacetal resin (A), which is a substrate of the resin composition of the present invention, is a polymer compound wherein an oxymethylene unit (—$CH_2O$—) is a major structural unit. Examples thereof include polyacetal homopolymers such as "Derlin" (trademark), manufactured by Du Pont USA and polyacetal copolymers containing an oxymethylene group and other comonomer units such as "Duracon" (trademark) manufactured by Polyplastics Co., Ltd. The comonomer unit of the polyacetal copolymer includes an oxyalkylene unit having about 2 to 6 carbon atoms, preferably about 2 to 4 carbon atoms, such as an oxyethylene group (—$CH_2CH_2O$—), oxypropylene group and oxytetramethylene group. The comonomer unit is contained in such an amount that the crystallinity of the resin is not largely impaired. Specifically, the proportion of the comonomer unit to the structural unit of the polyacetal polymer may usually be selected from the range between 0.01 and 20 mol %, preferably 0.03 and 10 mol % and more preferably 0.1 to 7 mol %. The polyacetal copolymer may be a copolymer composed of two components or a terpolymer composed of three components. Further, the polyacetal copolymer may be a random copolymer, a block copolymer or a graft copolymer. No particular limitation is imposed on the polymerization degree and the branched or cross-linking degree of the polyacetal resin (A) and any polyacetal resin may be used as far as it can be melt-molded. As the polyacetal resin (A) compounded in the present invention, a polyacetal copolymer is particularly preferable in view of the thermal stability. Also, when the polyacetal copolymer is a substrate resin, the effect of improving the rigidity by compounding a branched polyacetal copolymer (B) is more significant.

Next, the branched polyacetal copolymer (B) added to the polyacetal resin (A) in the resin composition of the present invention, is obtained by polymerizing a trioxane (a) and a monofunctional glycidyl compound (b) and further, if required, a cyclic ether compound (c) which can be copolymerized with a trioxane, thereby forming a branched structure.

Trioxane (a) herein used is a cyclic trimer of formaldehyde. Usually, it is prepared by the reaction of an aqueous solution of formaldehyde in the presence of an acidic catalyst and is used after purifying it by means of distillation or the like. It is preferred that trioxane used for the polymerization contains as little as possible of impurities such as water, methanol and formic acid.

The monofunctional glycidyl compound (b) is a compound having one glycidyl group and is used as a branched structure component of the branched polyacetal copolymer (B) to be compounded in the present invention.

As the monofunctional glycidyl component (b), glycidyl ether compounds shown by the above-shown formulae (I), (II), (III) and (IV) are preferred. Examples of the preferable compounds include p-tertiarybutylphenyl glycidyl ether, sec-butylphenyl glycidyl ether, n-butylphenyl glycidyl ether, phenylphenol glycidyl ether, cresyl glycidyl ether, dibromocresyl glycidyl ether, glycidyl 4-methylphenyl ether, glycidyl ether compounds having the following structures:

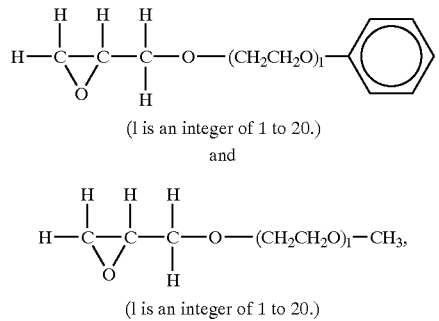

(l is an integer of 1 to 20.)
and (l is an integer of 1 to 20.)

methyl glycidyl ether, ethyl glycidyl ether, butyl glycidyl ether, 2-ethylhexyl glycidyl ether and 2-methyloctyl glycidyl ether.

Among them, compounds represented by the formulae (I) and (II) and having $R^2$ or $R^3$ at the ortho position are preferred. As a substituent, preferred are those having 4 or more carbon atoms, and particularly having an aromatic ring. Specific examples of the substituent include o-phenylphenol glycidyl ether.

The copolymerizing amount of the monofunctional glycidyl compound (b) is 0.01 to 10 parts by weight, and preferably 0.1 to 10 parts by weight, to 100 parts by weight of the trioxane. When a branched polyacetal copolymer comprising the less amount of the monofunctional glycidyl compound (b) than the above range is used, a polyacetal resin composition fails to obtain excellent rigidity, surface hardness and sliding property, which are intended in the present invention. On the contrary, when a branched polyacetal copolymer comprising the excessive copolymerizing amount of the monofunctional glycidyl compound (b) is used, there is a fear that problems arise in the rigidity due to a lowering of crystallinity and in the molding ability due to a lowering of fluidity.

The branched polyacetal copolymer (B) used in the present invention is preferably copolymerized further with a cyclic ether compound (c), which is copolymerizable with a trioxane, as the copolymerizing component other then the components (a) and (b). Although such a cyclic ether compound (c) is not particularly essential to improve the rigidity, surface hardness and sliding property, which are an object of the present invention, it is highly effective to use the cyclic ether compound as the copolymerizing component for stabilizing a polymerization reaction in the production of the branched polyacetal copolymer (B) and for increasing the thermal stability of the resultant branched polyacetal copolymer (B) Examples of the cyclic ether compound (c) copolymerizable with a trioxane include ethylene oxide, propylene oxide, butylene oxide, epichlorohydrin, epibromohydrin, styrene oxide, oxetane, 3,3-bis(chloromethyl)oxetane, tetrahydrofuran, trioxepane, 1,3-dioxolan, ethylene glycol formal, propylene glycol formal, diethylene glycol formal, triethylene glycol formal, 1,4-butanediol formal, 1,5-pentanediol formal and 1,6-hexanediol formal. Particularly, ethylene oxide, 1,3-dioxolan, diethylene glycol formal and 1,4-butanediol formal are preferably used. The copolymerizing amount of the cyclic ether compound (c) in the branched polyacetal copolymer (B) of the present invention, is 0 to 20 parts by weight, preferably 0.1 to 20 parts by weight or 0.05 to 15 parts by weight, and particularly preferably 0.1 to 10 parts by weight, to 100 parts by weight of the trioxane. When the copolymerizing proportion of the cyclic ether compound (c) is excessive, improvements in the rigidity, surface hardness and sliding property, which are intended in the present invention, are made insufficiently. On the other hand, when the proportion is small, copolymerizing the cyclic ether compound (c) is small effective on the stability of a copolymerization reaction and the thermal stability of the resultant branched polyacetal copolymer as described above.

In addition to the above components, a chemical component, which can form a branched structure, may be used in the branched polyacetal copolymer (B) of the present invention. Examples of the component capable of forming a branched structure include ethylene glycol diglycidyl ether, propylene glycol diglycidyl ether, 1,4-butanediol diglycidyl ether, hexamethylene glycol diglycidyl ether, resorcinol diglycidyl ether, bisphenol A diglycidyl ether, polyethylene glycol diglycidyl ether, polypropylene glycol diglycidyl ether, polybutylene glycol diglycidyl ether, glycerol and its derivatives, and pentaerythritol and its derivatives.

Basically, the branched polyacetal copolymer (B) compounded in the polyacetal resin (A) of the present invention is obtained, for example, by a method in which trioxane (a), a monofunctional glycidyl compound (b) and a cyclic ether compound (c) are subjected to a bulk-polymerization using a cationic polymerization catalyst where, if necessary, an appropriate amount of a molecular weight regulator is added thereto.

Examples of the molecular weight regulator are low-molecular acetal compound having alkoxy groups such as methylal, methoxymethylal, dimethoxymethylal, trimethoxymethylal, oxymethylene di-n-butyl ether, etc., alcohol such as methanol, ethanol, butanol, etc., and ester compounds. Among them, low molecular acetal compounds having alkoxy groups are particularly preferred. There is no limitation at all for the amount of such a molecular weight regulator to be added so far as the effect of the present invention is not deteriorated.

Examples of the cationic polymerization catalyst are lead tetrachloride, tin tetrachloride, titanium tetrachloride, aluminum trichloride, zinc chloride, vanadium trichloride, antimony trichloride, phosphorus pentafluoride, antimony pentafluoride, boron trifluoride and a coordination compound thereof such as boron trifluoride diethyl etherate, boron trifluoride dibutyl etherate, boron trifluoride dioxanate, boron trifluoride acetic anhydrate, boron trifluoride triethylamine complex, etc., inorganic and organic acids such as perchloric acid, acetyl perchlorate, tert-butyl perchlorate, hydroxyacetic acid, trichloroacetic acid, trifluoroacetic acid, p-toluenesulfonic acid, etc., complex salt compounds such as triethyloxonium tetrafluoroborate, triphenylmethyl hexafluoroantimonate, allyldiazonium hexafluorophosphate, allyldiazonium tetrafluoroborate, etc., alkyl metal salts such as diethyl zinc, triethyl aluminum, diethylaluminum chloride, etc., heteropolyacids and isopolyacids. Particularly preferred examples among them are boron trifluoride and coordination compounds thereof such as boron trifluoride diethyl etherate, boron trifluoride dibutyl etherate, boron trifluoride dioxanate, boron trifluoride acetic anhydrate and boron trifluoride triethylamine complex. Such a catalyst may be previously diluted with an organic solvent or the like and then used.

There is no particular limitation for the apparatus for polymerization in the manufacture of the branched polyacetal copolymer (B) used in the present invention but known apparatuses may be used and any of a batch method, a continuous method, etc. may be applicable. It is preferred to keep the polymerization temperature at 65–135° C. Deactivation after the polymerization is carried out by adding a basic compound or an aqueous solution thereof to a reaction product discharged from the polymerizing apparatus after the polymerization reaction or to a reaction product in the polymerizing apparatus. with regard to a basic compound for neutralizing and deactivating the polymerization catalyst, ammonia, amines such as triethylamine, tributylamine, triethanolamine, tributanolamine, etc., hydroxide salts of alkalimetal oralkali earth metal and other known catalyst deactivators may be used. It is preferred that, after the polymerization, an aqueous solution thereof is added to the product without delay to conduct deactivation. After such apolymerization and an deactivation, washing, separation/recovery of unreacted monomer, decomposition/removal of unstable terminals, sealing of unstable terminals by a stable material, drying, etc. may be carried out by conventional methods, if necessary.

There is no particular limitation for the polymerization degree, etc. of the branched polyacetal copolymer (B) obtained in the above manner. The polymerization degree, etc. can be controlled in accordance with the purpose of the product and molding means. However, when the branched polyacetal copolymer (B) is used for the resin composition to be molded, the melt index (MI) thereof, measured at 190° C. with a load of 2.06 kg, is preferably 1 to 100 g/10 min, and particularly a preferably 2 to 90 g/10 min.

The polyacetal resin composition of the present invention is characterized by the compounding of the above branched polyacetal copolymer (B) in the polyacetal resin (A). The amount of the branched polyacetal copolymer (B) in the resin composition of the present invention is 0.01 to 100 parts by weight, and preferably 1 to 80 parts by weight, to the polyacetal resin (A).

The aforementioned resin composition of the present invention may preferably be blended with a necessary stabilizer. Examples of the stabilizer used here are one or more of hindered phenol compounds, nitrogen-containing compounds, alkali or alkali earth metal hydroxides, inorganic salts, carboxylic acids, etc. Further, one or more common additive(s) such as coloring agents (e.g. dyes and pigments), lubricants, nucleating agent, releasing agents, antistatic agents, surface-active agents, organic polymer materials and inorganic or organic fillers in a form of fiber, powder or plate may be added.

EXAMPLES

Figure 1:
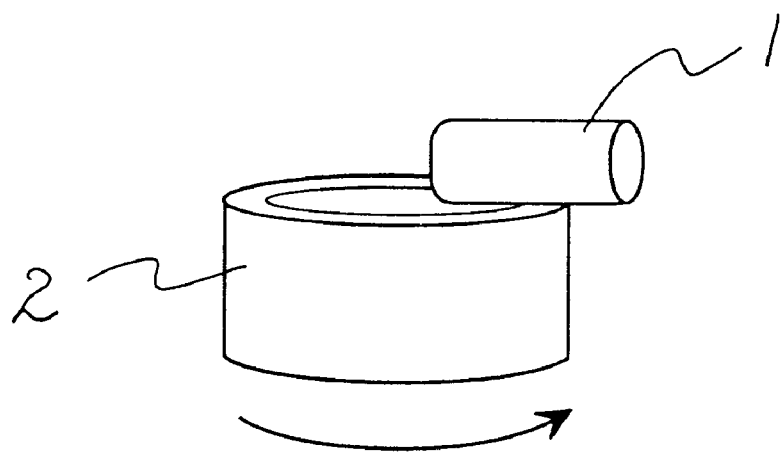
FIG. 1 shows a test condition of the evaluation of sliding property in the following Examples.

The present invention will now be further illustrated by way of the following examples although the present invention is not limited thereto.

Incidentally, items of the evaluated properties and measuring methods therefor are as follows.

[Bending Test]

A test piece was molded using an injection molding apparatus and the measurement was carried out according to a method of ASTM.

[Tensile Test]

A test piece of a dumbbell type was molded using an injection molding apparatus and the measurement was carried out according to a method of ASTM D638.

[Measurement of Rockwell Hardness]

A test piece was molded using an injection molding apparatus and the measurement was carried out according to a method of ASTM.

[Evaluation of Sliding Property]

A resin composition to be evaluated was injection-molded to prepare a cylindrical test piece of the Suzuki's system, having an outside diameter of 25.6 mm and an inside diameter of 20 mm. Next, using a friction and abrasion tester (manufactured by Orientech, EFM-III-EN), the test piece is slid on the round bar ($\phi$5 mm×5 mm) made of SUS 304 as the counter material to detect the time required for the friction torque to be increased to 120% of the initial torque. The time detected is determined as the breaking life of the slide surface (the breaking life is shown as converted into a repeated contact rotation of the bar and the Suzuki's specimen).

Specimen-1: a round bar made of SUS 304 with $\phi$5 mm×5 mm,

Specimen-2: the Suzuki's test piece (a cylindrical specimen with an outside diameter of 25.6 mm and an inside diameter of 20 mm), Load: 98 N, and Linear velocity: 5 cm/sec.

Examples 1–12

A continuous mixing reactor which is equipped with an outside jacket for passing hot (cold) medium therethrough and is constituted from a barrel having a cross section in such a shape that two circles are partly overlapped and also from a rotating axis having a paddle was used and, under rotation of the two rotating axes equipped with paddles at the rate of 150 rpm, a homogeneously mixed solution of trioxane (a), a glycidyl compound (b) and 1,3-dioxolane (c) and methylal (a molecular weight regulator) and boron trifluoride gas (a catalyst) in dibutyl ether (0.005% by weight to trioxane) were continuously added/supplied thereto whereupon a bulk polymerization was carried out. The reaction product discharged from the polymerizing apparatus was quickly passed through a pulverizing device together with adding to an aqueous solution of 60° C. containing 0.05% by weight of triethylamine to deactivate the catalyst. After that, separation, washing and drying were conducted to give a crude polyacetal copolymer having a branched-structure. To 100 parts by weight of the crude polyacetal resin were added 4% by weight of a 5% by weight aqueous solution of triethylamine and 0.3% by weight of pentaerythrityl tetrakis [3-(3,5-di-tert-butyl-4-hydroxyphenyl)propionate] and the mixture was melted and kneaded at 210° C. in a two-axial extruder to remove the unstable parts. After that, 0.03 part by weight of pentaerythrityl tetrakis[3-(3,5-di-tert-butyl-4-hydroxyphenyl)propionate] (a stabilizer) and 0.15 part by weight of melamine were added and the mixture was melted and kneaded at 210° C. in a two-axial extruder to give a polyacetal copolymer (b) in a form of pellets.

In the above process, compounds shown in Table 1 were used as the monofunctional glycidyl compound to obtain branched polyacetal copolymers (B) having a different branched structure from each other.

Next, the branched polyacetal copolymer (B) was compounded in the polyacetal resin (A), "Duracon M90" manufactured by Polyplastics Co., Ltd., in the ratios shown in Table 1 and each mixture was melt-kneaded using a twin extruder to obtain polyacetal resin compositions. These resin compositions were molded and evaluated as described above. Results of evaluation are shown in Table 1.

Comparative Example 1

A polyacetal resin, "Duracon M90" manufactured by Polyplastics Co., Ltd., was evaluated in the same way as the examples. Results of evaluation are-shown in Table 1.

TABLE 1

| | Polyacetal resin composition | | Composition of Branched Polyacetal Copolymer (B) | | | | | Results of Evaluation | | | |
|---|---|---|---|---|---|---|---|---|---|---|---|
| | Polyacetal resin | Branched polyacetal copolymer | trioxane | glycidyl compound (b) | | cyclic ether compound (c) | | TS | BM | RH | SP Breaking life |
| | (A) (wt. pts) | (B) (wt. pts) | (a) (wt. pts) | type | wt. pts | type | wt. pts | (MPa) | (MPa) | M scale | (× 10$^4$ times) |
| Ex. 1 | 100 | 5 | 100 | BGE | 0.2 | DO | 3.5 | 2590 | 65.0 | 93 | 60 |
| Ex. 2 | 100 | 5 | 100 | EHGE | 0.2 | DO | 3.5 | 2580 | 64.8 | 93 | 60 |
| Ex. 3 | 100 | 5 | 100 | CGE | 0.2 | DO | 3.5 | 2780 | 68.5 | 97 | 65 |
| Ex. 4 | 100 | 5 | 100 | GMPE | 0.2 | DO | 3.5 | 2840 | 68.2 | 96 | 78 |
| Ex. 5 | 100 | 5 | 100 | PPGE | 0.2 | DO | 3.5 | 2830 | 68.1 | 97 | 79 |
| Ex. 6 | 100 | 20 | 100 | PPGE | 0.2 | DO | 3.5 | 2900 | 70.0 | 99 | 80 |
| Ex. 7 | 100 | 50 | 100 | PPGE | 0.2 | DO | 3.5 | 2920 | 70.5 | 100 | 95 |
| Ex. 8 | 100 | 100 | 100 | PPGE | 0.2 | DO | 3.5 | 2950 | 71.0 | 100 | 101 |
| Ex. 9 | 100 | 100 | 100 | CGE | 0.1 | DO | 3.5 | 2950 | 71.0 | 100 | 100 |
| Ex. 10 | 100 | 50 | 100 | BGE | 0.1 | DO | 3.5 | 2600 | 65.2 | 95 | 65 |
| Ex. 11 | 100 | 50 | 100 | PPOGE | 0.2 | DO | 3.5 | 3000 | 71.5 | 98 | 90 |
| Ex. 12 | 100 | 50 | 100 | LAGE | 0.5 | DO | 3.5 | 2780 | 68.2 | 96 | 75 |
| Com. Ex. 1 | 100 | 0 | — | — | — | — | — | 2450 | 62.0 | 88 | 40 |

TS: Tensile Strength,
BM: Bending Modulus,
RH: Rockwell Hardness,
SP: Sliding Property
BGE: n-butyl glycidyl ether,
EHGE: 2-ethylhexyl glycidyl ether,
CGE: m,p-cresyl glycidyl ether,
GMPE: glycidyl 4-methoxy phenyl ether,
PPGE: o-phenylphenol glycidyl ether,
PPOGE: phenylpropyrene oxide glycidyl ether,
LAGE: lauryl alcohol (EO)$_{15}$ glycidyl ether, and
DO: 1,3-dioxolane.

What is claimed is:

1. A polyacetal resin composition comprising 100 parts by weight of a linear polyacetal copolymer (A) and 1 to 80 parts by weight of a branched polyacetal copolymer (B), which is obtained by copolymerization of 100 parts by weight of trioxane (a), 0.01–10 part(s) by weight of a monofunctional glycidyl compound (b) and 0–20 parts by weight of a cyclic ether compound (c) copolymerizable with trioxane, which is copolymerizable with trioxane, and wherein said monofunc tional glycidyl compound is represented by the following formula (IV):

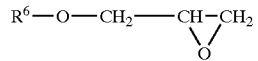

(IV)

wherein $R^6$ is n-butyl or 2-ethylhexyl.

2. The composition of claim 1, wherein the cyclic ether compound (c) which is copolymerizable with trioxane is selected from ethylene oxide, 1,3-dioxolan, diethylene glycol formal and 1,4-butanediol formal.

3. The composition of claim 1, wherein the amount of the branched polyacetal copolymer (B) is 3 to 80 parts by weight.

* * * * *